US006956095B2

(12) United States Patent
Treacher et al.

(10) Patent No.: US 6,956,095 B2
(45) Date of Patent: Oct. 18, 2005

(54) PROCESS FOR PRODUCING ARYL—ARYL COUPLED COMPOUNDS

(75) Inventors: Kevin Treacher, Northwich (GB); Philipp Stössel, Frankfurt (DE); Hubert Spreitzer, Viernheim (DE); Heinrich Becker, Glashütten (DE); Aurelie Falcou, Mainz (DE)

(73) Assignee: Covion Organic Semiconductors GmbH (DE)

( * ) Notice: Subject to any disclaimer, the term of this patent is extended or adjusted under 35 U.S.C. 154(b) by 0 days.

(21) Appl. No.: 10/495,003

(22) PCT Filed: Dec. 2, 2002

(86) PCT No.: PCT/EP02/13584

§ 371 (c)(1),
(2), (4) Date: Aug. 23, 2004

(87) PCT Pub. No.: WO03/048225

PCT Pub. Date: Jun. 12, 2003

(65) Prior Publication Data

US 2004/0260090 A1 Dec. 23, 2004

(30) Foreign Application Priority Data

Dec. 6, 2001 (DE) ........................................ 101 59 946

(51) Int. Cl.$^7$ ................................................ C08G 79/08

(52) U.S. Cl. ........................... 528/8; 528/394; 528/397; 525/92 A

(58) Field of Search ........................... 528/8, 394, 397; 525/92 A; 252/301.16

(56) References Cited

U.S. PATENT DOCUMENTS

| | | |
|---|---|---|
| 5,919,930 A | 7/1999 | Haber et al. |
| 6,541,602 B1 | 4/2003 | Spreitzer et al. |

FOREIGN PATENT DOCUMENTS

| | | | |
|---|---|---|---|
| DE | 198 46 768 | | 4/2000 |
| WO | WO 00/22027 | * | 4/2000 |

* cited by examiner

*Primary Examiner*—James J. Seidleck
*Assistant Examiner*—Irina S. Zemel
(74) *Attorney, Agent, or Firm*—Connolly Bove Lodge & Hutz

(57) ABSTRACT

The invention relates to the preparation of aryl-aryl coupled compounds and materials. These materials play an important role in industry, for example as liquid crystals, pharmaceuticals and agrochemicals, to mention just a few application areas. These compounds, in particular, are also of major importance especially in the high-growth area of organic semi-conductors (for example, applications in organic or polymeric light-emitting diodes, organic solar cells, organic ICs).

16 Claims, No Drawings

PROCESS FOR PRODUCING ARYL— ARYL COUPLED COMPOUNDS

The invention relates to the preparation of aryl-aryl coupled compounds and materials. These materials play an important role in industry, for example as liquid crystals, pharmaceuticals and agrochemicals, to mention just a few application areas. These compounds, in particular, are also of major importance especially in the high-growth area of organic semi-conductors (for example, applications in organic or polymeric light-emitting diodes, organic solar cells, organic ICs).

For the synthesis of such compounds an extremely wide variety of alternatives is known but these do not in all cases offer a solution that is, for example, technically, economically and ecologically satisfactory. In many processes there occur undesirable reactions and undesirable products, which have to be separated off and disposed of by costly means or which cannot be removed and then may result in problems when the material is used.

The efficiency of the process (degree of conversion) is especially important when the reaction of one or more multifunctional compound(s) is involved. An example of a reaction of that kind is the reaction of a multifunctional compound with a monofunctional compound resulting in a discrete molecule. A further example is a polymerisation reaction in which one or more multifunctional compound(s) is/are reacted with one or more further multifunctional compound(s). In many polymer applications, a high molecular weight is required in order to obtain the desired physical properties, for example film formation, flexibility, mechanical stability and other properties. Especially in the case of organic semi-conductors, the electrical properties are greatly influenced by the molecular weight—usually a very high molecular weight is required in order to prevent defects such as short circuits in the electrical device. Furthermore, a high degree of process reproducibility is required for that application. The degree of polymerisation (DP, average number of repeating units in the chain) of a polymer built up by step-wise growth is related to the degree of conversion of the reaction (p) as follows:

$$DP = \frac{1}{1-p}$$

When a high DP is desired, the reaction needs to be very efficient, for example p=0.95, DP=20 or p=0.99, DP=100.

The so-called Suzuki reaction (Synthetic Communications, 11(7), 513, (1981)) has been found to be a suitable reaction for the preparation of aryl-aryl coupled compounds; it involves the hetero coupling of a halide- or sulphonoxy-functional aromatic compound with a compound containing an aryl-boron functionality in the presence of a base, a palladium compound and a solvent.

Several variations of the reaction parameters are known. Generally, it is usual to carry out the reaction using two phases: an aqueous phase containing the major part of a base and an organic phase containing the major part of the aryl compounds. As organic solvent there is often used a non-polar aromatic solvent, for example benzene, toluene, xylenes (for example, Chem. Commun., 1598, (1997)). It is also known to carry out the reaction in a mixture of an aromatic solvent such as, for example, benzene or toluene and an alcohol such as, for example, methanol or ethanol (see, for example, J. Med. Chem., 40(4), 437, (1997)). Those water-miscible solvents serve as reaction accelerators by improving the contact between the base and the aromatic boron compound. However, we have found, surprisingly, that the presence of such α-H-functional alcohols results in undesirable subsidiary products and accordingly in a reduction in reaction efficiency.

EP-A-0694530 teaches that a process based on a combination of water-soluble complex ligands, a palladium compound soluble in the organic phase, and sufficient water for the reaction mixture to form an aqueous phase offers advantages for aryl compounds especially containing electrophilic groups. However, that process has several shortcomings:

Firstly, water-soluble ligands are problematic for highly non-polar substrates because the concentrations both of the active catalyst (water-soluble palladium-phosphine complex) and of the highly non-polar starting materials are not sufficiently high in the same phase to bring the reaction speed to a sensible level. That problem with the reaction speed results in an increase in the occurrence of subsidiary reactions and, as a result, in reduced reaction efficiency.

Secondly, the process usually results in yields of only from 90 to 95%, which might be satisfactory for the purposes of preparing a simple molecule (that is to say a molecule having just one aryl-aryl coupled unit) but is not adequate for the preparation of multiply coupled individual molecules or polymers.

Thirdly, the process is carried out using relatively high molar ratios of palladium (about 1 mol %), resulting in high costs and resource-intensive clean-up.

Fourthly, normally an excess of aromatic boron compound is also employed in order to compensate for the hydrolysis of the aryl-boron bond that occurs as a subsidiary reaction. That is disadvantageous, on the one hand because of the waste of materials but also, especially in the case of polymerisation, because a molar ratio of exactly 1:1 is then required in order to obtain high molecular weights and that molar ratio is adversely affected by the hydrolysis.

JP-A-2001/089404 describes a process for the preparation of polycyclic aromatic compounds wherein an aromatic boron compound is coupled with an aromatic halogenated compound in the presence of a carbonyl compound. The fact that the reaction is carried out in the presence of a base results in problems of undesirable chemical reactions between the base and the carbonyl compound. Those subsidiary reactions are not only disadvantageous for the efficiency of the main reaction but also result in the formation of relatively large amounts of impurities.

Processes are also known in which a phase-transfer reagent is used in order to improve the contact between the base and the aromatic boron compound:

1. U.S. Pat. No. 5,777,070 (WO 99/20675) describes a polymerisation process for the reaction of a bifunctional aromatic boron compound with a bifunctional aryl-halide in the presence of an organic solvent, an aqueous solution of an inorganic base and a catalytic amount of a palladium complex wherein a phase-transfer catalyst (for example, a tetraalkylammonium salt) is employed in a molar ratio of at least 0.01% (and preferably less than 10 mol %), based on the aromatic boron compound. However, that process has several problems which are also the subject of criticism in, for example, WO 00/53656:

Firstly, the reaction proceeds relatively slowly and the polymer that is prepared exhibits discoloration.

Secondly, the reaction is not reproducible in terms of molecular weight.

Thirdly, foam formation is observed during the reaction and deposition of subsidiary products occurs on the reactor wall, resulting in a process that can be scaled-up only with difficulty.

2. WO 00/53656 reports on a related process, in which as base there is used an organic compound (for example, a tetraalkylammonium hydroxide) which is effective in increasing the concentration of base in the organic phase, resulting in the reaction's proceeding much more rapidly. However, we have found that there are disadvantages to the process:

When the reaction according to the described process is carried out in a non-polar solvent such as toluene, a white solid is precipitated from the reaction mixture, which solid can be re-dissolved only with difficulty (the reaction mixture is still cloudy even after 20 hours). It is to be presumed that the solid is a salt of the $R_4N^+[ArBR'_2(OH)]^-$ type. The reaction accordingly proceeds slowly and still remains heterogeneous even after a relatively long period, which means that an end point is not reached. This means, inter alia, that a really high molecular weight is not obtained in the case of polymers.

Secondly, under various conditions the reaction results in various kinds of discoloration; when the reaction is carried out in the presence of a non-polar solvent such as toluene, the polymer exhibits a slightly grey-black discoloration, whereas in the presence of a polar solvent (for example, THF or dioxane) the polymer has a yellow discoloration. The grey-black colour is due to decomposition of the palladium catalyst, with colloidal palladium separating out. The yellow colour indicates decomposition of the base or of the salt formed therefrom. Those impurities are undesirable especially in the case of electronic applications (for example, as organic semi-conductors in light-emitting diodes) because they result in considerable impairment of quality.

Furthermore, the use of those bases has further disadvantages:

The described bases (and the borate salts formed therefrom) are, by virtue of their nature, phase-transfer catalysts and accordingly can be separated off from the product only by relatively resource-intensive means, resulting in the fact that work-up takes longer and, therefore, becomes more costly and residues that may not have been removed can have an adverse effect in use.

In addition, such organic bases are generally more expensive by a factor of from 5 to 10 than the mineral bases otherwise used (such as, for example, carbonates or phosphates of alkali metals).

Furthermore, bases of that kind also result, in many cases, in foam formation.

Fourthly, a relatively large amount of catalyst (about 0.15 mol %, based on the amount of aryl-halogen groups) is needed, resulting in palladium concentrations in the crude polymer in the range from 100 to 1000 ppm, which in turn results in the problems of work-up and residual impurities that have already been discussed a number of times hereinbefore.

From this critique of the prior art it is clear that there is still a need for processes of high efficiency which, at a low catalyst concentration, result in aryl-aryl coupled compounds with a minimum of undesirable reactions. We have now found surprisingly that, by using certain solvent mixtures in the presence of very low concentrations of palladium compounds which do not contain triphenylphosphine, the Suzuki reaction proceeds with especially high reaction efficiency.

The invention accordingly relates to a process for the reaction of a halogen- or sulphonyloxy-functional aryl or heteroaryl compound with an aromatic or heteroaromatic boron compound in the presence of a catalytic amount of a palladium compound, a base and a solvent mixture wherein an aryl-aryl or aryl-heteroaryl or heteroaryl-heteroaryl C—C bond is formed, characterised in that a. the solvent mixture comprises at least 0.1% by volume of a compound from each of the following groups i) water-miscible organic solvents ii) water-immiscible organic solvents iii) water, with the proviso that both alcohols and carbonyl compounds which contain α-hydrogen atoms are excluded;

b. the palladium compound does not contain triphenylphosphine or the latter is not actually added to the reaction mixture.

The reaction according to the invention can then proceed (depending on the exact composition and temperature) with either one or more than one phase or may also change in that regard whilst the reaction is being carried out. However, the reaction according to the invention preferably proceeds with more than one phase.

Aryl or heteroaryl compounds and the aromatic or heteroaromatic radicals of the corresponding boron compounds are aromatic or heteroaromatic entities containing from 2 to 40 C atoms which may be substituted by one or more linear, branched or cyclic alkyl or alkoxy radicals containing from 1 to 20 C atoms wherein one or more non-consecutive $CH_2$ groups may also have been replaced by O, S, C═O or a carboxy group, substituted or unsubstituted C-2 to C-20 aryl or heteroaryl radicals, fluorine, cyano, nitro or, sulphonic acid derivatives, or which may be unsubstituted. Simple compounds which may preferably be used are the corresponding substituted or unsubstituted derivatives of benzene, naphthalene, anthracene, pyrene, biphenyl, fluorene, spiro-9,9'-bifluorene, phenanthrene, triptycene, pyridine, furan, thiophene, benzothiadiazole, pyrrole, quinoline, quinoxaline, pyrimidine, and pyrazine. There are, furthermore, expressly included corresponding (as defined by the text hereinbefore) multifunctional compounds and also oligomers formed during polymerisation which have functional aryl or heteroaryl terminal groups.

The starting compounds for the process according to the invention are, on the one hand, halogen- or sulphonyloxy-functionalised aryl or heteroaryl compounds of formula (I)

$$Ar—(X)_n \qquad (I)$$

wherein Ar is an aryl or heteroaryl radical as defined hereinbefore, X denotes —Cl, —Br, —I, $—OS(O)_2R^1$, and $R^1$ is an alkyl, aryl or fluorinated alkyl radical and n denotes at least 1, preferably from 1 to 20, especially 1, 2, 3, 4, 5 or 6.

The second class of starting compounds for the process according to the invention comprises aromatic or heteroaromatic boron compounds of the general formula (II)

$$Ar—(BQ_1Q_2)_m \qquad (II)$$

wherein Ar is an aryl or heteroaryl radical as defined hereinbefore, $Q_1$ and $Q_2$ are the same or different on each occurrence and denote —OH, $C_1$–$C_4$alkoxy, $C_1$–$C_4$aryloxy, $C_1$–$C_4$alkyl or halogen, or $Q_1$ and $Q_2$ together form a $C_1$–$C_4$alkylenedioxy group which may optionally be substituted by one or more $C_1$–$C_4$alkyl groups, or $Q_1$ and $Q_2$ and the boron atom together are part of a boroxine ring of formula (III) or of similar boronic anhydrides or partial anhydrides

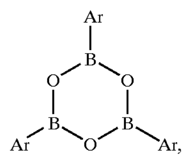

(III)

and m denotes at least 1, preferably from 1 to 20, especially 1, 2, 3, 4, 5 or 6.

For the synthesis of linear polymers, the value 2 is preferably selected for n and m simultaneously.

The palladium compound consists of a palladium source and optionally one or more additional components.

The palladium source may be either a palladium compound or metallic palladium. Suitable palladium sources are salts of palladium(II), or palladium(0) compounds or complexes. Preferred palladium sources are palladium(II) halides, palladium(II) carboxylates, palladium(II)β-diketonates, tris(dibenzylideneacetone)dipalladium(0) ($Pd_2dba_3$), dichloro(bisbenzonitrile)palladium(II), dichloro(1,5-cyclooctadiene)-palladium(II), tetrakis(triarylphosphino) palladium(0) or discrete compounds of palladium with the additional components described as follows.

Additional components that may be used for the formation of the active palladium compound are, in the widest sense, ligands which can coordinate at the palladium metal centre.

Preferred variants are phosphine ligands from the group of tri-aryl-phosphines, di-aryl-alkyl-phosphines, aryl-dialkyl-phosphines, trialkyl-phosphines, tri-heteroaryl-phosphines, di-heteroaryl-alkyl-phosphines, heteroaryl-dialkyl-phosphines, it being possible for the substituents on the phosphorus to be the same or different, chiral or achiral, it being possible for one or more of the substituents to link the phosphorus groups of a plurality of phosphines and it also being possible for some of those links to be one or more metal atoms, with the exception of triphenylphosphine. Furthermore, halo-phosphines, dihalo-phosphines, alkoxy- or aryloxy-phosphines, dialkoxy- or diaryloxy-phosphines may also be used.

Very special preference is given to, inter alia, substituted triphenylphosphines according to formula (IV),

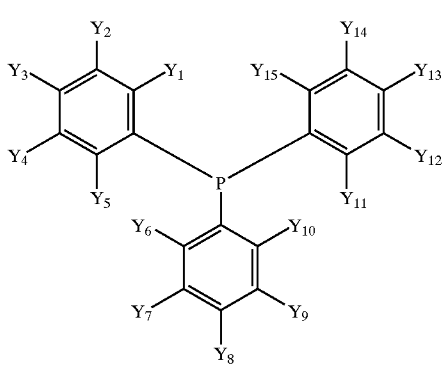

(IV)

wherein $Y_1$ to $Y_{15}$ are the same or different and are hydrogen, alkyl, aryl, alkoxy, dialkylamino, chlorine, fluorine, sulphonic acid, cyano or nitro radicals, with the proviso that at least 1 but preferably 3 or more of the substituents $Y_1$ to $Y_{15}$ are not hydrogen. Examples of the variants to which very special preference is given are tris(o- or m- or p-tolyl) phosphine, tris(o- or m- or p-anisyl)phosphine, tris(o- or m- or p-fluorophenyl)-phosphine, tris(o- or m- or p-chlorophenyl)-phosphine, tris(2,6-dimethylphenyl)-phosphine, tris(2,6-dimethoxyphenyl)phosphine, tris (mesityl)phosphine, tris(2,4,6-trimethoxyphenyl)phosphine and tris(pentafluorophenyl)phosphine.

Further preferred ligands are tert-butyl-di-o-tolylphosphine, di-tert-butyl-o-tolyl-phosphine, dicyclohexyl-2-biphenylphosphine, di-tert-butyl-2-biphenylphosphine, triethylphosphine, tri-iso-propyl-phosphine, tri-cyclohexylphosphine, tri-tert-butylphosphine, tri-tert-pentylphosphine, bis(di-tert-butylphosphino)methane and 1,1'-bis(di-tert-butylphosphino)ferrocene.

Triphenylphosphine has been excluded from the invention because it was found, surprisingly, that it results in an especially high level of undesirable reactions. The use of the other ligands according to the invention, as described hereinbefore, avoids those disadvantages.

The palladium compound may be either in solid (that is to say heterogeneous) or dissolved form and, in the latter case, may be dissolved either in the organic phase or in the aqueous phase.

In the process according to the invention, the palladium compound is usually employed in an amount of from 0.00001 mol % to 5 mol % (palladium), based on the amount of C—C links to be closed. Preference is given here to the range from 0.001% to 2%, especially the range from 0.001% to 1%.

The additional component (ligand) is usually added in the range from 10:1 to 1:2, preferably in the range from 8:1 to 1:1, based on the palladium content.

The bases are used, for example, analogously to U.S. Pat. No. 5,777,070. There are used, for example, alkali and alkaline earth metal hydroxides, carboxylates, carbonates, fluorides and phosphates such as sodium and potassium hydroxide, acetate, carbonate, fluoride and phosphate or also metal alcoholates, preferably corresponding phosphates or carbonates. Where appropriate, mixtures of bases may be used.

As understood by this Application, a "water-miscible organic solvent" means a solvent which forms a clear, single-phase solution at room temperature both when at least 5% by weight water is present in the solvent and when at least 5% by weight solvent is present in water.

Preferred solvents of that kind are organic ethers, esters, nitrites, tertiary alcohols, sulphoxides, amides and carbonates, especially ethers and very especially dioxane, tetrahydrofuran, ethylene glycol ether, DME and various polyethylene glycol ethers. In the process according to the invention, preference is given to one or more solvents selected from that class in a range (based on the total volume of the reaction mixture) from 1 to 90%, especially in a range from 10 to 75%, very especially in a range from 25 to 75%.

As understood by this Application, a "water-immiscible organic solvent" means a solvent which no longer forms a clear, single-phase solution at room temperature, that is to say phase separation is already discernible, even when less than 5% by weight water is present in the solvent or even when less than 5% by weight solvent is present in water.

Preferred water-immiscible solvents are aromatic and aliphatic hydrocarbons, non-polar ethers, chlorine-containing hydrocarbons, preferably aromatic hydrocarbons, very especially toluene, xylenes or anisole.

In the process according to the invention, preference is given to one or more solvents selected from that class in a range (based on the total volume of the reaction mixture) from 1 to 70%, especially in a range from 10 to 50%, very especially in a range from 15 to 50%.

The water used is usually of normal quality, that is to say tap water, where appropriate having been deionised. For special requirements it is of course possible also to use grades which are of better purity or from which salts have been removed. In the process according to the invention, preference is given to using water in a range (based on the total volume of the reaction mixture) from 1 to 50%, especially from 5 to 35%.

The process according to the invention is usually slightly exothermic, although generally requires slight activation. The reaction is, therefore, frequently carried out at temperatures above room temperature. A preferred temperature range is, therefore, the range between room temperature and the boiling point of the reaction mixture, especially the temperature range between 40 and 120° C., very especially the range between 40 and 100° C. However, it is also possible that the reaction will proceed sufficiently rapidly even at room temperature so that no active heating is required.

The reaction is performed with stirring, it being possible to use simple stirrers or high-viscosity stirrers depending on the viscosity of the reaction mixture. In the case of high viscosities, vortex breakers may also be used.

The concentrations of the reaction components will depend greatly on the reaction in question. Whereas polymerisations (because of the increase in viscosity they involve) are frequently carried out at concentrations in the range below 1 mol/l (based on the C—C bonds to be closed), a higher concentration range may also be used in the synthesis of defined individual molecules.

The reaction time may, in principle, be freely selected and will be based on the speed of the reaction in question. A technically sensible frame of reference will certainly be in the range from a few minutes up to 100 hours, preferably in the range from 15 minutes to 24 hours.

The reaction per se proceeds at normal pressure. However, it may well also be technically advantageous to proceed at elevated or reduced pressure. This will depend greatly on the individual reaction and, especially, on the equipment available.

The advantages of the described process according to the invention are, inter alia, as follows:

Outstanding efficiency (degree of conversion), as a result of which materials are obtained which contain very few flaws. The process according to the invention is advantageous especially in the case of multifunctional compounds because the efficiency effect is then potentiated. Very especially in the case of polymerisations wherein the starting materials usually contain two groups to be reacted and the aryl-aryl coupling is carried out a number of times in succession to form a molecule in the form of a chain, the process according to the invention results in chains of extraordinarily great length and in extraordinarily high molecular weights.

A particular advantage of the present invention is that, by virtue of the improved efficiency of the Suzuki reaction, the amount of expensive palladium catalyst employed can be reduced. This means that manufacturing costs are reduced and, in addition, the amounts of residual palladium in the product are dramatically reduced. This brings technical advantages, for example avoidance of an impaired product colour, although the reduction in such impurities is advantageous especially in the case of organic semi-conductors because the presence of metal residues will result in impairments in use.

The further disadvantages, as described hereinbefore for the Applications WO 00/53656 and U.S. Pat. No. 5,777,070 (WO 99/20675), either are entirely overcome (for example, relatively expensive bases or phase-transfer catalysts) or are at least greatly mitigated (foam formation).

Because the process according to the invention—as described hereinbefore—is of very high efficiency, a preferred embodiment is the reaction of multifunctional molecules either to form defined individual molecules or to form polymers.

As understood by this Application, "multifunctional" means that a compound contains a plurality of (for example, two, three, four, five etc.) identical or similar functional units which, in the reaction in question (in this case the Suzuki reaction), all react in the same way to produce one product molecule. "Multifunctional" is intended also to include molecules that contain a plurality of functional groups that react with one another (for example, a molecule that contains both at least one aromatic halogen group and also at least one aromatic boron group—a so-called AB monomer). The reaction of multifunctional compounds firstly means herein the reaction of one multifunctional compound with a plurality of monofunctional compounds to form one defined compound "of low molecular weight". When, on the other hand, (at least) two different multifunctional compounds are brought into reaction with one another, the product will have a polymeric character. This too expressly constitutes a Suzuki reaction as understood by this invention.

As will be seen from the context, "of low molecular weight" as understood by the present invention denotes molecules having a defined molar mass, which will always be <10000 g/mol, and also preferably <2000 g/mol.

In accordance with the present invention, a polymeric character is present when the characterising properties (for example, solubility, melting point, glass transition temperature etc.) do not change or change only insubstantially when an individual repeating unit is added or omitted. A simpler definition (especially to contrast with the statements relating to "of low molecular weight") is the indication of molecular weight, according to which a "polymeric character" is to be defined as a molecular weight of >10000 g/mol.

As described hereinbefore, a preferred embodiment of the process according to the invention is the use thereof in the linking of a multifunctional compound to a plurality of monofunctional compounds.

The compounds thereby produced are distinguished by the absence (or a very low content) of structural defects produced by the reaction.

Those compounds, produced by the process according to the invention, consequently exhibit significant improvements over the prior art, and the invention accordingly also relates thereto.

As described hereinbefore, a further preferred embodiment of the process according to the invention is the use thereof during a polymerisation reaction.

The polyarylenes (this term is here intended also to include copolymers that do not contain arylene or heteroarylene units in the main chain) thereby produced are distinguished by a high (but also readily controllable) molecular weight and by the absence (or a very low content) of structural defects produced by the polymerisation. Those polymers, produced by the process according to the invention, consequently exhibit significant improvements over the prior art, and the invention accordingly also relates thereto.

This process makes possible the preparation of polyarylenes or -heteroarylenes having higher molecular weights than previously known. The highest previously published weight-average degree of polymerisation ($M_w$, measured by GPC, divided by the average molecular weight of the repeating unit(s)) is about 950 and the process according to the invention yields polymers which in some cases have significantly higher values (see Example 5). The invention accordingly relates also to poly-arylenes or -heteroarylenes having a weight-average degree of polymerisation $DP_w$ of more than 1000.

A preferred polymerisation process according to the invention may be described as follows:

As "water-miscible organic solvent" there is used dioxane or THF in the range from 25 to 75% (based on the total volume of the solution).

As "water-immiscible organic solvent" there is used an aromatic solvent, for example toluene, a xylene, chlorobenzene or anisole, preferably toluene or a xylene, in the range from 15 to 50%.

Water is added in the range from about 5 to 50%.

The monomers are used in a concentration range from 20 to 200 mmol/l. Either the two different functionalities (halide or sulphonyloxy versus boron groups) are set out in the ratio 1:1 (as exactly as possible) at the outset or that ratio is brought about in the course of the reaction by subsequent (either continuous or batch-wise) addition of one of the two functionalities to an excess of the other functionality.

Where appropriate, small amounts of monofunctional compounds ("end-cappers") or tri- or multi-functional groups ("branchers") are added.

The palladium compound is added in a ratio of from 1:10000 to 1:50, preferably from 1:5000 to 1:100, based on the number of bonds to be closed. In this case, preference is given, for example, to the use of palladium(II) salts such as $PdAc_2$ or $Pd_2$ $dba_3$ and to the addition of ligands such as $P(o\text{-}Tol)_3$, the latter in a ratio of from 1:1 to 1:10, based on Pd.

As base there is preferably used, for example, $K_3PO_4$, which is preferably added in a ratio of from 0.8:1 to 5:1, based on the number of bonds to be closed.

The reaction is maintained under reflux with vigorous stirring and carried out over a period of about from 1 hour to 24 hours.

It has been found to be advantageous at the end of the reaction to carry out so-called end-capping, that is to say to add monofunctional compounds which will catch any reactive end groups in the polymers.

At the end of the reaction, the polymer may be further purified by customary purification procedures such as, for example, precipitation, reprecipitation, extraction and the like. For use in high-quality applications (for example, polymeric light-emitting diodes), contamination with organic (for example, oligomeric) and inorganic substances (for example, Pd residues, base residues) usually has to be brought to as low a level as possible. That may be achieved, for Pd, in a very great variety of ways, for example by means of ion-exchangers, liquid-liquid extraction, extraction with complex-formers and other procedures, for the removal of low-molecular-weight substances, for example by solid-liquid or liquid-liquid extraction or also by reprecipitation a number of times, for the removal of further inorganic impurities, for example by the procedures already described for Pd and low-molecular-weight substances and also by extraction with, for example, inorganic mineral acids.

In a further possible embodiment of the polymerisation described above, the polymerisation is carried out in at least two steps, an excess of one of the monomers being employed in the first step so that a short-chain polymer having a first composition is formed. "Short-chain" herein means that there is only formed, at first, an oligomer having a few (for example, between 3 and 20) repeating units. The remaining monomers are subsequently added in one or more further step(s) so that finally the ratio of boron-containing reactive groups and halogen- or sulphonyloxy-containing reactive groups is 1:1.

The monomer composition of the second or further steps is preferably different to that of the first step, as a result of which polymers having a block-like structure are formed.

A "block-like structure" herein means the following: as a result of the first step there is formed, for example, an oligomer having the sequence $B(AB)_n$ wherein A and B are the two monomer units used, B being the monomer used in excess and n being the average length of those oligomers. Subsequently, there is then added, for example, a monomer C so that the total number of reactive end groups is balanced out. This results finally in a polymer mainly comprising sequences as follows: $(C[B(AB)_n])_m$ wherein m is the average chain length of the polymer thereby defined; that is to say blocks having the structure B(AB)N alternate with C and the polymer has a block-like structure. Of course it is also possible, depending on the sequence of monomer addition, to produce further block-like structures by means of the process described.

The process according to the invention makes possible the preparation of high-molecular-weight polymers having that block-like form because, in contrast to the processes known hitherto, it has an especially non-damaging effect on the boron-, halogen- or sulphonyloxy-containing reactive groups in the absence of the corresponding counterpart groups.

Using the process described herein, it is now possible to prepare, for example, polyarylenes as described in EP-A-842.208, WO 00/22026, WO 00/46321, WO 99/54385, WO 00/55927, WO 97/31048, WO 97/39045, WO 92/18552, WO 95/07955, EP-A-690.086, WO 02/044060 and in the specification of Application DE 10143353.0, which has not yet been laid open for public inspection. The polymers prepared by the process according to the invention frequently exhibit advantages over the statements made in the cited literature, for example with respect to freedom from defects, molecular weight, molecular weight distribution and frequently also, therefore, with respect to the corresponding properties of use.

The polymers according to the invention can be used in electronic components such as organic light-emitting diodes (OLEDs), organic integrated circuits (O-ICs), organic field-effect transistors (OFETs), organic thin-film transistors (OTFTs), organic solar cells (O-SCs), organic laser diodes (O-lasers), organic colour filters for liquid crystal displays or organic photoreceptors, to which the present invention also relates.

The described invention is illustrated by the description and the examples that are given hereinbelow although it is in no way limited thereto but may of course be readily applied by the person skilled in the art to the systems indicated above or described in the cited literature.

Part A. EXAMPLES OF THE PROCESS ACCORDING TO THE INVENTION

A1: Preparation of Multifunctional Compounds

Preparation of 2,2',7,7'-tetrakis(biphenyl-4-yl)-9,9'-spirobifluorene, procedure:

2,2',7,7'-Tetrabromo-9,9'-spirobifluorene (158.0 g, 250 mmol), biphenyl-4-boronic acid (239.0 g, 1200 mmol) and potassium phosphate (447 g, 2100 mmol) were suspended in a mixture of 700 mL of toluene, 700 mL of dioxane and 1000 mL of water, and argon was passed through the solution for 30 minutes. There were then added tris-o-tolylphosphine (0.459 g, 1.5 mmol) and, 5 minutes later, 58 mg (0.25 mmol) of palladium acetate, and the reaction mixture was heated at 87° C. After 8 hours, the mixture was cooled to room temperature and the precipitated solid was filtered off and washed with water and then with toluene, yielding 222 g (96% of theory) of the desired product, which, according to HPLC without further purification, had a purity of 99.6%.

$^1$H NMR ($CDCl_3$): 7.98 (d, 4H, H-4), 7.72 (dd, 4H, H-3), 7.54 (m, 24H, phenyl-H) 7.40 (m, 8H, phenyl-H), 7.31 (m, 4H, phenyl-H), 7.10 (d, 4H, H-1).

A2: Preparation of Polymers

The synthesis of the monomers used in this Application has been described in the specification of Application WO 02/077060. The monomers used are reproduced as follows:

M1

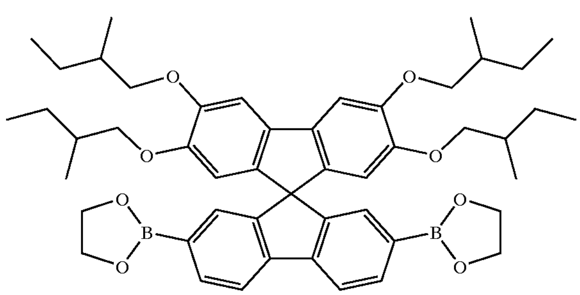

M2

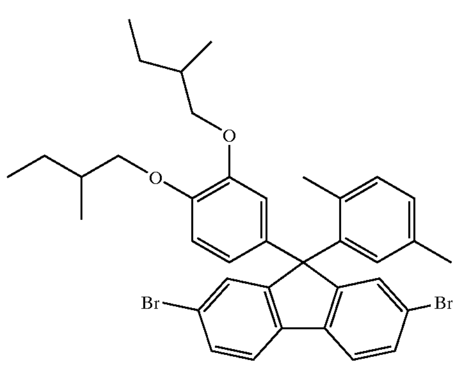

-continued

M3

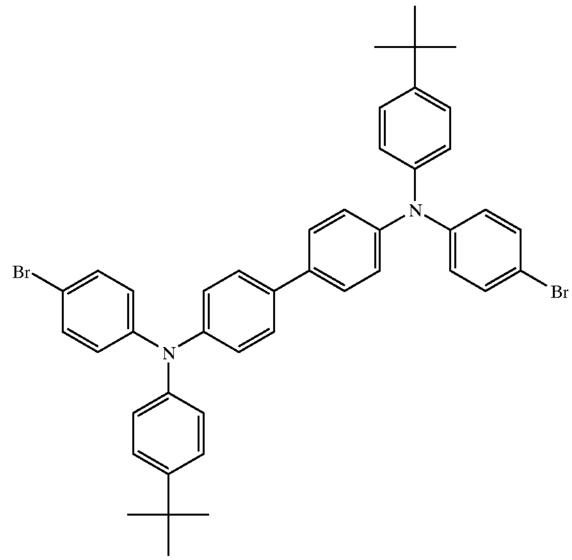

M4

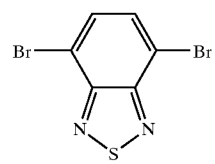

M5

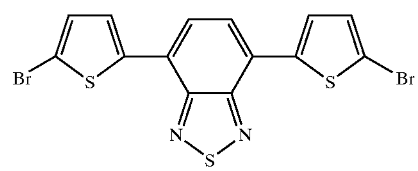

EXAMPLE P1

Use of dioxane/toluene mixture with 0.025 mol % Pd. Copolymerisation of 50 mol % 2',3',6'7'-tetra (2-methylbutyloxy)spirobifluorene-2,7-bisboronic acid ethylene glycol ester (M1), 50 mol % 2,7-dibromo-9-(2',5'-dimethyl-phenyl)-9-[3",4"-bis (2-methyl-butyloxy)phenyl] fluorene (M2) (polymer P1).

3.3827 g (5.00 mmol) of M2 (content: 99.85%), 4.0033 g (5.00 mmol) of M1 (content: 99.4%), 4.89 g (21.25 mmol) of $K_3PO_4.H_2O$, 15.6 mL of toluene, 46.9 mL of dioxane and 8.5 mL of water were degassed by passing argon through for 30 minutes. There were then added 4.56 mg (15 $\mu$mol) of tris-o-tolylphosphine and, 5 minutes later, 0.56 mg (2.5 $\mu$mol) of palladium acetate under a protective gas. The suspension was vigorously stirred under a blanket of argon at an internal temperature of 87° C. (slight reflux). After 2 hours, because of the high viscosity, a further 15.6 mL of toluene and 46.9 mL of dioxane were added. After 6 hours, a further 0.30 g of M1 was added. After heating for a further 1 hour, 0.3 mL of bromobenzene was added and was heated at reflux for a further 1 hour.

The reaction solution was diluted with 200 mL of toluene and the solution was stirred with 100 mL of 1% aqueous NaCN for 3 hours. The organic phase was washed 3 times with $H_2O$ and precipitation was carried out by adding to 500 mL of methanol. The polymer was dissolved in 600 mL of THF for 1 hour at 50° C., precipitated using 1200 mL of MeOH, washed and dried in vacuo. Reprecipitation was carried out again in 600 mL of THF/1200 mL of methanol, followed by filtration under suction and drying to constant weight. 5.16 g (8.78 mmol, 87.8%) of the polymer P1 were obtained in the form of a colourless solid.

$^1$H NMR ($C_2D_2Cl_4$): 7.8–7.1 (m, 9H, fluorene, spiro); 6.6 (br. s, 1H, fluorene), (br s, 1H, spiro); 4.0–3.4 (3×m, 6H, $OCH_2$), 2.16 (s, 1.5H, $CH_3$); 1.9–0.7 H).

GPC: THF; 1 mL/min, PL-gel 10 μm Mixed-B 2×300×7.5 mm$^2$, 35° C., RI detection: Mw=814000 g/mol, Mn=267000 g/mol.

EXAMPLE P2

Use of dioxane/toluene mixture with 0.0125 mol % Pd. Copolymerisation of 50 mol % 2',3', 6', 7'-tetra(2-methylbutyloxy)spirobifluorene-2,7-bisboronic acid ethylene glycol ester (M1), 40 mol % 2,7-dibromo-9-(2',5'-dimethyl-phenyl)-9-[3",4"-bis(2-methyl-butyloxy)phenyl] fluorene (M2) and 10 mol % N,N'-bis (4-bromophenyl)-N, N'-bis(4-tert-butylphenyl)benzidine (M3) (polymer P2).

13.5308 g (20.00 mmol) of M2 (content: 99.85%), 20.0164 g (25 mmol) of M1 (content: 99.4%), 3.7932 g (5.00 mmol) of M3 (content: 99.5%), 24.47 g (106.25 mmol) of $K_3PO_4.H_2O$, 78 mL of toluene, 234 mL of dioxane and 44 mL of water were degassed by passing argon through for 30 minutes. There were then added 11.4 mg (37 μmol) of tris-o-tolylphosphine and, 5 minutes later, 1.40 mg (6.25 μmol) of palladium acetate under a protective gas. The suspension was vigorously stirred under a blanket of argon at an internal temperature of 87° C. (slight reflux). After 2 hours, because of the high viscosity, a further 39 mL of toluene and 117 mL of dioxane were added. After 6 hours, a further 0.36 g of M1 was added. After heating for a further 30 minutes, 0.5 mL of bromobenzene was added and was heated at reflux for a further 15 minutes.

The reaction solution was diluted with 500 mL of toluene and was stirred with 100 mL of 2% aqueous NaCN for 3 hours. The organic phase was washed 3 times with $H_2O$ and precipitation was carried out by adding to 2500 mL of methanol. The polymer was dissolved in 1500 mL of THF for 1 hour at 50° C., precipitated using 3000 mL of MeOH, washed and dried in vacuo. Reprecipitation was carried out again in 1500 mL of THF/3000 mL of methanol, followed by filtration under suction and drying to constant weight. 27.005 g (45.3 mmol, 90.6%) of the polymer P2 were obtained in the form of a slightly yellowish solid.

$^1$H NMR ($C_2D_2Cl_4$): 7.9–6.8 (m, 10.4H, fluorene, spiro, TAD); 6.6 (br. s, 0.8H, fluorene), 6.21 (m, 1H, spiro); 4.0–3.4 (3×m, 5.6H, $OCH_2$), 2.16 (s, 1.2H, $CH_3$); 1.9–0.7 (m, alkyl H, including tert-butyl at 1.30).

GPC: THF; 1 mL/min, PL-gel 10 μm Mixed-B 2×300×7.5 mm$^2$, 35° C., RI detection: Mw=630000 g/mol, Mn=240000 g/mol.

EXAMPLE P3

Use of toluene/dioxane mixture and 0.1 mol % Pd with thiophene-containing monomers. Copolymerisation of 50 mol % 2',3',6,7'-tetra(2-methyl-butyloxy)spirobifluorene-2, 7-bisboronic acid ethylene glycol ester (M1), 35 mol % 4,7-dibromo-benzo[1,2,5]thiadiazole (M4), 10 mol % N,N'-bis(4-bromophenyl)-N,N'-bis (4-tert-butylphenyl)benzidine (M3) and 5 mol % bis-4,7-(2'-bromo-5'-thienyl)-2, 1,3-benzothiadiazole (M5) (polymer P3)

8.0065 g (10.00 mmol) of M1 (content: 99.4%), 2.0578 g (7 mmol) of M4 (content: 99.8%), 1.5173 g (2.00 mmol) of M3 (content: 99.5%), 0.4582 g (1.00 mmol) of M5 (content: 99.8%), 10.13 g (44.00 mmol) of $K_3PO_4.H_2O$, 25 mL of toluene, 75 mL of dioxane and 50 mL of water were degassed by passing argon through for 30 minutes. There were then added 36.5 mg (120 μmol) of tris-o-tolylphosphine and, 5 minutes later, 4.49 mg (20 μmol) of palladium acetate under a protective gas. The suspension was vigorously stirred under a blanket of argon at an internal temperature of 87° C. (slight reflux). After 30 minutes, because of the high viscosity, a further 40 mL of toluene and, after 90 minutes, a further 30 mL toluene were added. After 6 hours, a further 0.2 g of M1 was added. After heating for a further 30 minutes, 0.3 mL of bromobenzene was added and was heated at reflux for a further 15 minutes.

The reaction solution was diluted with 200 mL of toluene and was stirred with 100 mL of 2% aqueous NaCN for 3 hours. The organic phase was washed 3 times with $H_2O$ and precipitation was carried out by adding to 1000 mL of methanol. The polymer was dissolved in 600 mL of THF for 1 hour at 50° C., precipitated using 1200 mL of MeOH, washed and dried in vacuo. Reprecipitation was carried out again in 600 mL of THF/1200 mL of methanol, followed by filtration under suction and drying to constant weight. 8.65 g (18.8 mmol, 94.2%) of the polymer P3 were obtained in the form of a deep red solid.

$^1$H NMR ($CDCl_3$): 8.2–6.8 (m, 7.4H, Spiro, TAD, benzothiadiazole and thiophene); 6.6 (br. s, 0.8H, fluorene), 6.21 (m, 1H, spiro); 4.0–3.4 (2×m, 4H, $OCH_2$); 1.9–0.7 (m, alkyl H, including tert-butyl at 1.24).

GPC: THF; 1 mL/min, PL-gel 10 μm Mixed-B 2×300×7.5 mm$^2$, 35° C., RI detection: Mw=470000 g/mol, Mn=163000 g/mol.

EXAMPLE P4

Copolymer in 2 steps to form the polymer of block-like structure. First step, copolymerisation of 12.5 mol % 2',3', 6',7'-tetra(2-methylbutyloxy)spiro-bifluorene-2,7-bisboronic acid ethylene glycol ester (M1) and 10 mol % N,N'-bis(4-bromophenyl)-N, N'-bis(4-tert-butylphenyl) benzidine (M3). Second step, addition of 37.5 mol % 2',3',6',7'-tetra(2-methylbutyloxy)spirobifluorene-2,7-bisboronic acid ethylene glycol ester (M1) and 40 mol % 2,7-dibromo-9-(2',5'-dimethyl-phenyl)-9-[3",4"-bis(2-methyl-butyloxy)phenyl]fluorene (M2) (polymer P4)

0.8007 g (1.00 mmol) of M1 (content: 99.4%), 0.6069 g (0.80 mmol) of M3 (content: 99.5%), 3.91 g (17.00 mmol) of $K_3PO_4.H_2O$, 2.5 mL of toluene, 7.5 mL of dioxane and 8.5 mL of water were degassed by passing argon through for 30 minutes. There were then added 3.65 mg (12 μmol) of tris-o-tolylphosphine and, 5 minutes later, 0.45 mg (2.0 μmol) of palladium acetate under a protective gas. The suspension was vigorously stirred under a blanket of argon at an internal temperature of 87° C. (slight reflux) for 2 hours. According to NMR, 20% of the original boronic acid ethylene glycol ester groups were still present (signal at 4.28 ppm in $CDCl_3$), which was also expected from the stoichiometry. Then, there were further added 2.4020 g (3.00 mmol) of M1 (content: 99.4%), 2.1649 g (3.2 mmol) of M2 (content: 99.85%), 10 mL of toluene and 30 mL of dioxane. After 2 hours, because of the high viscosity, a further 12.5 mL of toluene and 37.5 mL of dioxane were added. After 6 hours, a further 0.30 g of M1 was added. After heating for a further 1 hour, 0.3 mL of bromobenzene was added and was heated at reflux for a further 1 hour. The reaction solution was diluted with 200 mL of toluene and was stirred with 100 mL of 1% aqueous NaCN for 3 hours. The organic phase was washed 3 times with $H_2O$ and precipitation was carried out by adding to 400 mL of methanol. The polymer was dissolved in 300 mL of THF for 1 hour at 50° C., precipitated using 600 mL of MeOH, washed and dried in vacuo. Reprecipitation was carried out again in 300 mL of THF/600 mL of methanol, followed by filtration under suction and drying to constant weight. 4.23 g (7.10 mmol, 88.7%) of the polymer P4 were obtained in the form of a slightly yellowish solid.

$^1$H NMR ($C_2D_2Cl_4$): 7.8–7.7 (m, 1H, spiro); 7.7–7.1 (m, 9.4H, fluorene, spiro, TAD); 6.6 (br. s, 0.8H, fluorene), 6.21 (m, 1H, spiro, exhibits an additional large signal at 6.27 ppm which is to be attributed to TAD-spiro-TAD units, proving block-like structures); 4.0–3.4 (3×m, 5.6H, $OCH_2$), 2.16 (s, 1.2H, $CH_3$); 1.9–0.7 (m, alkyl H, including tert-butyl at 1.30).

GPC: THF; 1 mL/min, PL-gel 10 μm Mixed-B 2×300×7.5 mm$^2$, 35° C., RI detection: Mw=480000 g/mol, Mn=150000 g/mol.

EXAMPLE P5

Use of dioxane/toluene mixture with 0.0125 mol % Pd, monomer M1 batch of greater purity. Copolymerisation of 50 mol % 2',3',6',7'-tetra(2-methyl-butyloxy) spirobifluorene-2,7-bisboronic acid ethylene glycol ester (M1), 40 mol % 2,7-dibromo-9-(2',5'-dimethyl-phenyl)-9-[3",4"-bis(2-methylbutyloxy)phenyl]fluorene (M2) and 10 mol % N,N'-bis(4-bromophenyl)-N,N'-bis(4-tert-butylphenyl)benzidine (M3) (polymer P5).

2.1649 g (3.20 mmol) of M2 (content: 99.85%), 3.2026 g (4.00 mmol) of M1 (content: 99.8%), 0.6069 g (0.80 mmol) of M3 (content: 99.5%), 3.91 g (17.0 mmol) of $K_3PO_4.H_2O$, 12.5 mL of toluene, 37.5 mL of dioxane and 6.8 mL of water were degassed by passing argon through for 30 minutes. There were then added 3.65 mg (12 μmol) of tris-o-tolylphosphine and, 5 minutes later, 0.45 mg (2 μmol) of palladium acetate under a protective gas. The suspension was stirred vigorously under a blanket of argon at an internal temperature of 87° C. (slight reflux). After 2 hours, because of the high viscosity, a further 12.5 mL of toluene and 37.5 mL of dioxane were added. After 6 hours, a further 0.03 g of M1 was added. After heating for a further 30 minutes, 0.1 mL of bromobenzene was added and was heated at reflux for a further 15 minutes.

The reaction solution was diluted with 80 mL of toluene and was stirred with 100 mL of 2% aqueous NaCN for 3 hours. The organic phase was washed 3 times with $H_2O$ and precipitation was carried out by adding to 400 mL of methanol. The polymer was dissolved in 300 mL of THF for 1 hour at 50° C., precipitated using 600 mL of MeOH, washed and dried in vacuo. Reprecipitation was carried out again in 300 mL of THF/600 mL of methanol, followed by filtration under suction and drying to constant weight. 44 g (7.45 mmol, 93.0%) of the polymer P5 were obtained in the form of a slightly yellow yellowish solid.

$^1$H NMR ($C_2D_2Cl_4$): 7.9–6.8 (m, 10.4H, fluorene, spiro, TAD); 6.6 (br. s, 0.8H, fluorene), 6.21 (m, 1H, spiro); 4.0–3.4 (3×m, 5.6H, $OCH_2$), 2.16 (s, 1.2H, $CH_3$); 1.9–0.7 (m, alkyl H, including tert-butyl at 1.30).

GPC: THF; 1 mL/min, PL-gel 10 μm Mixed-B 2×300×7.5 mm$^2$, 35° C., RI detection: Mw=1400000 g/mol, Mn=410000 g/mol, corresponding to a weight-average degree of polymerisation $DP_w$ of 2350.

PART B COMPARISON EXAMPLES—NOT INCLUDED IN THE INVENTION.

COMPARISON EXAMPLE V1

Use of toluene and triphenylphosphine as ligand, ethanol as phase-transfer reagent. Copolymerisation of 50 mol % 2',3',6',7'-tetra(2-methyl-butyloxy)spirobifluorene-2,7-bisboronic acid ethylene glycol ester (M1), 40 mol % 2,7-dibromo-9-(2',5'-dimethyl-phenyl)-9-[3",4"-bis(2-methylbutyloxy)phenyl]fluorene (M2) and 10 mol % N,N'-bis(4-bromophenyl)-N,N'-bis(4-tert-butylphenyl)benzidine (M3) (polymer V1).

2.000 g (2.4979 mmol) of M1 (content: 99.4%), 1.3519 g (1.9983 mmol) of M2 (content: 99.85%), 0.3789 g (0.4995 mmol) of M3 (content: 99.5%), 2.07 g (8.994 mmol) of $K_3PO_4.H_2O$, 6 mL of toluene, 3.8 mL of $H_2O$ and 0.2 mL of ethanol were degassed by passing argon through for 30 minutes. There were then added 58 mg (0.0499 mmol) of tetrakis(triphenylphosphino)palladium(0) under a protective gas. The suspension was stirred vigorously under a blanket of argon at an internal temperature of 87° C. (slight reflux). After 7 days, the reaction mixture was dark grey and a further 0.2 g of M1 was added. After heating for a further 2 hours, 0.3 mL of bromobenzene was added and was heated at reflux for a further 1 hour.

The reaction solution was diluted with 120 mL of toluene and was stirred with 100 mL of 2% aqueous NaCN for 3 hours. The organic phase was washed 3 times with $H_2O$ and precipitation was carried out by adding to 200 mL of methanol. The polymer was dissolved in 100 mL of THF, precipitated using 200 mL of MeOH, washed and dried in vacuo. Reprecipitation was carried out again in 100 mL of THF/200 mL of methanol, followed by filtration under suction and drying to constant weight. 2.07 g (3.48 mmol, 69.6%) of the polymer V1 were obtained in the form of a yellow solid.

$^1$H NMR ($C_2D_2Cl_4$): 7.9–6.8 (m, 10.4 H, fluorene, spiro, TAD); 6.6 (br. s, 0.8H, fluorene), 6.21 (m, 1H, spiro); 4.0–3.4 (3×m, 5.6H, $OCH_2$), 2.16 (s, 1.2H, $CH_3$) 1.9–0.7 (m, alkyl H, including tert-butyl at 1.30).

GPC: THF; 1 mL/min, PL-gel 10 μm Mixed-B 2×300×7.5 mm$^2$, 35° C., RI detection: Mw=25000 g/mol, Mn=10400 g/mol.

Comparison Example V2

Use of toluene as solvent, triphenylphosphine as ligand and tetraethylammonium hydroxide as base in accordance with WO 00/53656.

Copolymerisation of 50 mol % 2', 3', 6',7'-tetra(2-methylbutyloxy)spirobifluorene-2,7-bisboronic acid ethylene glycol ester (M1) and 50 mol % 2,7-dibromo-9-(2',5'-dimethyl-phenyl)-9-[3",4"-bis(2-methylbutyloxy)phenyl] fluorene (M2) (polymer V2). 3.3827 g (5.00 mmol) of M2 (content: 99.85%), 4.0033 g (5.00 mmol) of M1 (content: 99.4%), 17.3 mg (15 μmol) of tetrakis(triphenylphosphino) palladium(0) and 62.5 mL of toluene were degassed by passing argon through for 10 minutes. There were then added 8.32 g (22.5 mmol) of 40% aqueous tetraethylammonium hydroxide solution and 8.32 mL of water under a protective gas. The suspension was heated under a blanket of argon at an internal temperature of 87° C., whereupon a white solid precipitated out, which redissolved after a few minutes except for a residue at the rim of the flask. After refluxing for 2 hours, 1 mL of bromobenzene was added. After a further hour, 1.5 g of phenylboronic acid were added and refluxing was carried out for a further 1 hour.

The reaction solution was precipitated in 400 mL of methanol, separated by filtration and subsequently washed with water and methanol. The polymer was dissolved in 200 mL of toluene and precipitated in 400 mL of MeOH, washed and dried to constant weight in vacuo. 5.52 g (9.39 mmol, 93.9%) of the polymer V2 were obtained in the form of a yellow-grey solid.

$^1$H NMR ($C_2D_2Cl_4$): 7.8–7.1 (m, 9H, fluorene, spiro); 6.6 (br. s, 1H, fluorene), 6.21 (m, 1H, spiro); 4.0–3.4 (3×m, 6H, $OCH_2$), 2.16 (s, 1.5H, $CH_3$); 1.9–0.7 (m, alkyl H).

GPC: THF; 1 mL/min, PL-gel 10 μm Mixed-B 2×300×7.5 mm$^2$, 35° C., RI detection: Mw=149000 g/mol, Mn=44000 g/mol.

Part C: PRODUCTION AND CHARACTERISATION OF LEDS:

LEDs were produced according to the general procedure outlined hereinbelow. Of course, in individual cases the procedure had to be adapted to the particular circumstances (for example, polymer viscosity and optimum polymer layer thickness in the device). The LEDs described hereinbelow were, in each case, two-layer systems, that is to say substrate//ITO//PEDOT//polymer//cathode. PEDOT is a polythiophene derivative.

General Procedure for the Production of High-Efficiency, Long-Life LEDs:

After the ITO-coated substrates (for example, glass support, PET film) have been cut to the correct size, they are cleaned in an ultrasonic bath in a number of cleaning steps (for example, soap solution, Millipore water, isopropanol).

For drying, they are blasted using an $N_2$ gun and stored in a desiccator. Before coating with the polymer, they are treated with an ozone plasma apparatus for about 20 minutes. A solution of the polymer in question (usually in a concentration of 4–25 mg/mL in, for example, toluene, chlorobenzene, xylene:cyclohexanone (4:1)) is prepared, dissolution being carried out by stirring at room temperature. Depending on the polymer, it may also be advantageous to stir at 50–70° C. for some time.

When dissolution of the polymer is complete, it is filtered through a 5 μm filter and applied using a spin-coater at variable speeds (400–6000). The layer thicknesses can, as a result, be varied in the range from about 50 to 300 nm. Beforehand, a conductive polymer, preferably doped PEDOT or PANI, is usually applied to the (structured) ITO.

Electrodes are also applied to the polymer films. This is usually carried out by thermal vapour deposition (Balzer BA360 or Pfeiffer PL S 500). The transparent ITO-electrode is connected up as the anode, and the metal electrode (for example, Ba, Yb, Ca) as the cathode, and the device parameters are determined. The service life is defined as the time taken for 50% of the original brightness to be reached and is measured at 100 cd/$m^2$.

The results obtained with the polymers described are compiled in Table 1.

| Polymer | Amounts of monomers in polymerisation [%] | | | | GPC* | | Electroluminescence** | | | | | Visco.*** |
|---|---|---|---|---|---|---|---|---|---|---|---|---|
| | | | | | $M_W$ (·1000 | $M_N$ (·1000 | $\lambda_{max}$ | Max. eff. | Voltage at 100 Cd/$m^2$ | | Service life at 100 Cd/$m^2$ | 10 mg/mL in toluene |
| (type) | Monom. 1 | Monom. 2 | Monom. 3 | Monom. 4 | g/mol) | g/mol) | [nm] | [Cd/A] | [V] | EL colour | [hours] | (cPs) |
| P1 | 50% M1 | 50% M2 | — | — | 814 | 267 | 455 | 1.0 | 5.2 | Deep blue | 1500 | 29.8 |
| P2 | 50% M1 | 40% M2 | 10% M3 | — | 630 | 240 | 462 | 2.5 | 5.0 | Blue | 3000 | 6.8 |
| P3 | 50% M1 | 35% M4 | 10% M3 | 5% M5 | 470 | 163 | 632 | 1.8 | 3.5 | Red | 8000 | 5.5 |
| P4, 1st step | 12.5% M1 | — | 10% M3 | — | — | — | — | — | — | — | — | — |
| P4, 2nd step | 37.5% M1 | 40% M2 | — | — | 480 | 150 | 455 | 1.8 | 4.5 | Deep blue | 3500 | 6.3 |
| P5 | 50% M1 | 40% M2 | 10% M3 | — | 1400 | 410 | 457 | 2.7 | 4.2 | Blue | 4000 | 76 |
| V1 | 50% M1 | 40% M2 | 10% M3 | — | 25 | 10 | 475 | 1.1 | 7.7 | White-blue | 20 | 0.9 |
| V2 | 50% Ml | 50% M2 | — | — | 149 | 50 | 470 | 0.6 | 6.2 | White-blue | 100 | 1.8 |

*GPC measurements THF; 1 mL/min, PI-gel 10 μm Mixed-B 2 × 300 × 7.5 $mm^2$, 35° C., RI detection was calibrated against polystyrene

**For production of polymer LEDs, see Part C

***Viscosity of the polymer solutions at 10 mg/mL in toluene was measured at 40 $s^{-1}$ in a Brookfield LVDV-III Rheometer (CP-41).

What is claimed is:

1. Process for the reaction of a halogen- or sulphonyloxy-functional aryl or heteroaryl compound with an aromatic or heteroaromatic boron compound in the presence of a catalytic amount of a palladium compound, a base and a multi-phase solvent mixture wherein an aryl-aryl or aryl-heteroaryl or heteroaryl-heteroaryl C—C bond is formed, characterised in that a. the solvent mixture comprises at least 0.1% by volume of a compound from each of the following groups i) water-miscible organic solvents ii) water-immiscible organic solvents iii) water, with the proviso that both alcohols and carbonyl compounds which contain α-hydrogen atoms are excluded;

b. and the palladium compound does not contain triphenylphosphine or the latter is not specifically added to the reaction mixture.

2. Process according to claim 1, characterised in that the aryl or heteroaryl compounds and the aromatic or heteroaromatic radicals of the corresponding boron compounds denote aromatic or heteroaromatic entities containing from 2 to 40 C atoms which may be substituted by one or more linear, branched or cyclic alkyl or alkoxy radicals containing from 1 to 20 C atoms wherein one or more non-consecutive $CH_2$ groups may also have been replaced by O, S, C═O or a carboxy group, substituted or unsubstituted C-2 to C-20 aryl or heteroaryl radicals, fluorine, cyano, nitro or suiphonic acid derivatives, or which may be unsubstituted.

3. Process according to claim 2, wherein said halogen- or sulphonyloxy-functionalized aryl or heteroaryl compounds are of formula (I)

$$Ar—(X)_n \quad (I)$$

wherein

Ar is an aryl or heteroaryl radical as defined in claim 2,

X denotes —Cl, —Br, —I, —$OS(O)_2R^1$, and $R^1$ is an alkyl, aryl or fluorinated alkyl radical, and n denotes at least 1.

4. Process according to claim 2, wherein the aromatic or heteroaromatic boron compounds are of the general formula (II)

$$Ar—(BQ_1Q_2)_m \quad (II)$$

wherein

Ar is an aryl or heteroaryl radical as defined in claim 2, $Q_1$ and $Q_2$ are the same or different and denote —OH, $C_1$–$C_4$alkoxy, $C_1$–$C_4$aryloxy, $C_1$–$C_4$alkyl or halogen, or $Q_1$ and $Q_2$ together form a $C_1$–$C_4$alkylenedioxy group which may optionally be substituted by one or more $C_1$–$C_4$alkyl groups, or $Q_1$ and $Q_2$ and the boron atom together are part of a boroxine ring of formula (III)

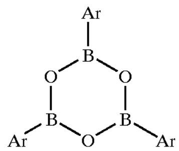

(III)

and m denotes at least 1.

5. Process according to claim 1, wherein the palladium compound consists of a palladium source and optionally one or more additional components, the palladium source being either salts of palladium(II), or palladium(0) compounds or complexes or also metallic palladium, and the additional components being ligands which can coordinate at the palladium metal centre.

6. Process according to claim 5, wherein said additional component(s)are phosphine ligands from the group of tri-aryl-phosphines, di-aryl-alkyl-phosphines, aryl-dialkyl-phosphines, trialkyl-phosphines, tri-heteroaryl-phosphines, di-heteroaryl-alkyl-phosphines, heteroaryl-diallcyl-phosphines, optionally the substituents on the phosphorus to be the same or different, chiral or achiral, and optionally one or more of the substituents to link the phosphorus groups of a plurality of phosphines and optionally some of those links to be one or more metal atoms, except that triphenyiphosphine is not used.

7. Process according to claim 1, wherein said water-miscible organic solvents has at least one solvent which forms a clear, single-phase solution at room temperature both when at least 5% by weight water is present in the solvent and when at least 5% by weight solvent is present in water.

8. Process according to claim 1, wherein said water-immiscible organic solvent there is used at least one solvent which no longer forms a clear, single-phase solution at room temperature, that is to say phase separation is already discernible, even when less than 5% by weight water is present in the solvent or even when less than 5% by weight solvent is present in water.

9. Process according to claim 1, wherein in the process, a reaction of one multifunctional compound with a plurality of monofunctional compounds to form one defined compound of low molecular weight is carried out.

10. Process according to claim 1, wherein in the process, at least two different multifunctional compounds are brought into reaction with one another and a polymeric product is obtained.

11. Process according to claim 10, characterised in that the polymerisation is carried out in at least two steps, an excess of one monomer being employed in the first step so that a short-chain polymer having a first composition is formed, and the remaining monomer being subsequently added in one or more further step(s) so that finally the ratio of boron-containing reactive groups and halogen- or sulphonyloxy-containing reactive groups is 1:1.

12. Process according to claim 11, characterised in that the monomer composition of the second or further steps is different to that of the first step, as a result of which polymers having a block structure are formed.

13. The process as claimed in claim 3, wherein n is 1 to 20.

14. The process as claimed in claim 4, wherein m is 1 to 20.

15. Poly-arylene or -heteroarylene, having a $M_n$ in the range of 150,000 to 410,000 g/mol, obtained by the process according to claim 1.

16. The poly-arylene or -heteroarylene obtained by the process according to claim 1.

* * * * *

UNITED STATES PATENT AND TRADEMARK OFFICE

CERTIFICATE OF CORRECTION

PATENT NO. : 6,956,095 B2
DATED : October 18, 2005
INVENTOR(S) : Kevin Treacher et al.

It is certified that error appears in the above-identified patent and that said Letters Patent is hereby corrected as shown below:

Column 19,
Line 23, “di-heteroaryl-alkyl-phosphines, heteroaryl-diallcyl-” should read -- di-heteroaryl-alkyl-phosphines, heteroaryl-dialkyl- --.

Signed and Sealed this

Twenty-seventh Day of December, 2005

JON W. DUDAS
*Director of the United States Patent and Trademark Office*